United States Patent [19] [11] 3,917,053
Matsuyama [45] Nov. 4, 1975

[54] INTERLOCKING DEVICE FOR ARTICLE TRANSPORTER HAVING PUSHER FINGERS

[75] Inventor: Seiichi Matsuyama, Hiroshima, Japan

[73] Assignee: Mitsubishi Jukogyo Kabushiki Kaisha, Tokyo, Japan

[22] Filed: Sept. 7, 1973

[21] Appl. No.: 395,170

[30] Foreign Application Priority Data
Sept. 13, 1972 Japan............................ 47-10609

[52] U.S. Cl................. 198/232; 198/22 R; 198/175
[51] Int. Cl.²......................................... B65G 43/02
[58] Field of Search..... 198/232, 23, 34, 168, 22 R, 198/22 B, 175; 271/180, 181, 258; 53/77

[56] References Cited
UNITED STATES PATENTS

| 1,925,395 | 9/1933 | Holland-Letz | 198/168 |
| 1,930,292 | 10/1933 | Hooydonk | 198/168 |
| 1,940,647 | 12/1933 | Gruetter | 198/232 |
| 2,013,144 | 9/1935 | Gladfelter | 198/232 |
| 2,632,553 | 3/1953 | Stirn et al. | 198/34 |
| 2,762,497 | 9/1956 | Howard | 198/232 |
| 2,794,541 | 6/1957 | Chayka | 198/232 |
| 2,827,159 | 3/1958 | Peteler | 198/232 |
| 3,190,434 | 6/1965 | Dardaine | 198/34 |
| 3,718,246 | 2/1973 | Dardaine et al. | 198/34 |

Primary Examiner—Richard A. Schacher
Assistant Examiner—Richard K. Thomson
Attorney, Agent, or Firm—Cushman, Darby & Cushman

[57] ABSTRACT

In an articles transporting apparatus having a finger support arranged to circulate along a predetermined route and a plurality of pusher fingers secured to said finger support, whereby the articles delivered successively in several rows by a conveyor means are divided into groups each of a predetermined number of articles by the pusher fingers and further transported, characterized in that the finger support has formed therein substantially along its full length a pressurized fluid supply hole connected to a pressurized fluid source and a plurality of vertical holes arranged at suitable intervals along the length of the finger support, the large diameter portion at the upper end of each pusher finger being axially slidably inserted into the corresponding one of the vertical holes through the medium of a sealing member, the vertical holes being all connected to the pressurized fluid supply hole, and that the driving source of the finger support is stopped by a detection signal from a pressure change detecting means provided at a suitable location in the pressurized fluid supply hole.

1 Claim, 6 Drawing Figures

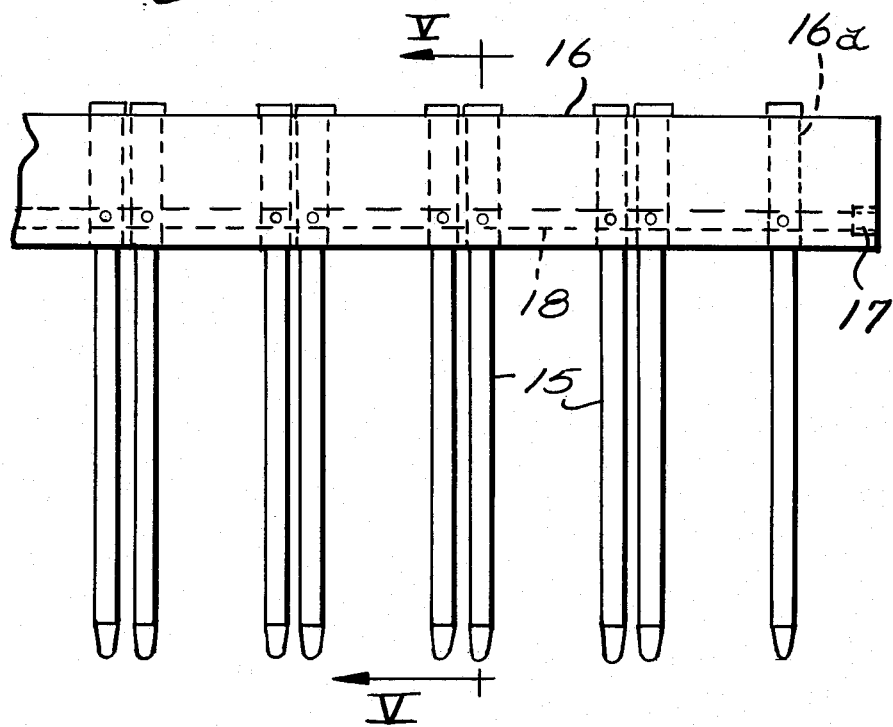
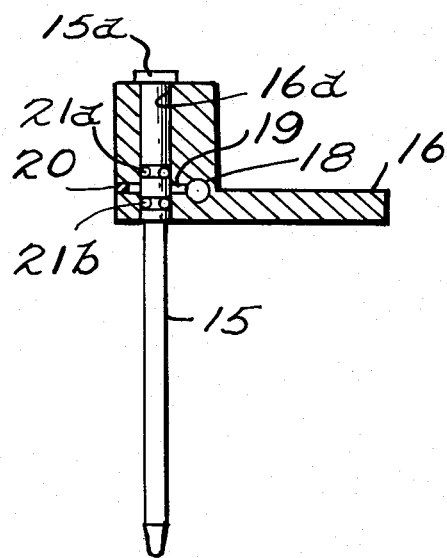
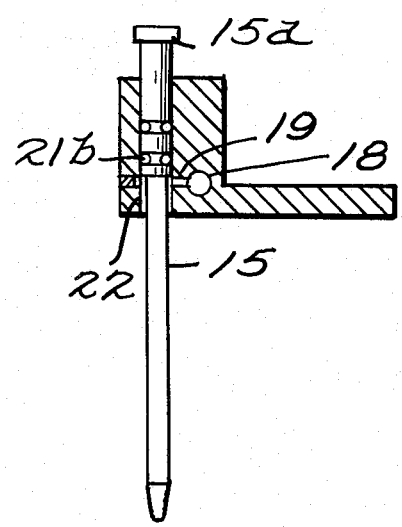

INTERLOCKING DEVICE FOR ARTICLE TRANSPORTER HAVING PUSHER FINGERS

This invention relates to an interlocking device for an articles transporting apparatus whereby the cylindrical articles such as cans, bottles, or the like delivered successively in several rows on a conveyor are divided into groups each of a predetermined number of articles, with adjoining articles being contacted side-by-side, and further transported in that condition.

The conventional articles transporting apparatuses of this type are generally constructed as shown in FIGS. 1 and 2. Namely, as shown in these figures, endless chains 3a, 3b are passed round the respective groups of sprockets 2a, 2b which are arranged in two vertical stages in a completely same positional relation on the inner walls of a pair of opposed frameworks 1 (only one framework on the left side is shown in figures), and a finger support 7 is mounted between a pair of brackets 5 supported by connecting pins 4a, 4b of said chains 3a, 3b, with the upper end portions of a plurality of pusher fingers 6 being secured to the finger support 7 at suitable intervals. The stems of the sprockets 2a, 2b positioned at the foremost ends of both groups of sprockets are extended out beyond the frameworks 1 on both sides, and sprockets 8a, 8b are secured to the extended portions of the stems. Numeral 9 in the figures refers to a sprocket driven by the operation of a driving source. Sprocket 9 is coupled to a driving shaft 11 through a safety clutch 10. Mounted on driving shaft 11 is still another sprocket 12, and an endless chain 13 is passed round sprocket 12 and aforesaid sprockets 8a, 8b. In FIG. 1, numeral 14 indicates a cylindrical article such as can, bottle or the like which is to be transported, and letter A indicates an article conveyor, B an articles aligning plate, and C an articles discharging plate.

In operation of such apparatus, when the sprocket 9 is driven by a driving source, its driving force is transmitted to the driving shaft 11 through the safety clutch 10, causing the sprocket 12 as well as sprockets 2a, 2b through endless chain 13 to rotate at a same speed in a same predetermined direction. This also causes the endless chains 3a, 3b to move circulatively at a same predetermined speed passing round the respective sprockets in the directions of arrows, allowing the brackets 5 to also move circulatively along a predetermined route — that is, repeats the cycle of recessive upward movement → recessive horizontal movement → downward movement → forward horizontal movement — with circulating movement of respective endless chains 3a, 3b. In the meanwhile, the cylindrical articles 14 are delivered successively in several rows on the transport conveyor A, so that when each bracket 5 makes the downward movement in the cycle, the lower end portions of the pusher fingers 6, which have their upper end portions secured to the finger support 7, fit into the spaces S (see FIG. 3) between the adjoining articles 14, and then when said bracket 5 makes the next forward horizontal movement, the cylindrical articles 14 positioned in front of the pusher fingers 6 are pushed by the fingers so that adjoining articles 14 are pushed out onto the article aligning plate B and carried thereon in a mutually contacted state, separated from the succeeding articles. The speed of forward horizontal movement of each bracket 5 is of course so set that it is faster than the moving speed of the conveyor A. In these apparatuses, there has been also employed an interlocking device, such as described below, to provide for a situation where either of the pusher fingers 6 fails to snugly fit into the space S between the adjoining articles 14. According to such interlocking device, when a trouble such as above-said takes place, the safety clutch 10 is slipped by the overtorque of the driving shaft 11 to disconnect the driving source of the sprocket 9 from the driving shaft 11 and at the same time the slip of the safety clutch 10 is detected by a limit switch (now shown) to stop operation of the driving source by the detection signal to thereby temporarily suspend the circulating movement of the brackets 5 and hence the finger support 7. However, such interlocking device has difficulties in making correct adjustment of the safety clutch 10, and when the cylindrical articles to be transported are soft articles such as aluminium cans or when the circulating speed of the endless chains 3a, 3b is high and the momentum of the pusher fingers 6, finger support 7, brackets 5, endless chains 3a, 3b, and endless chain 13 is large, it often occurs that even if the pusher fingers 6 properly fit with the articles 14, the safety clutch 10 won't slip or, if slipped, it might unduly hit the articles 14 to form a dent, hole or other deformation to render the articles into commercially unacceptable ones.

The present invention has been proposed with the object of eliminating such defects of the conventional interlocking systems of the type discussed, and the device is now described in detail by way of an embodiment thereof as illustrated in the accompanying drawings.

In the drawings:

FIG. 1 is a schematic side view, FIG. 2 is a partial view (on the right side) taken in the direction of arrow II — II of FIG. 1, and FIG. 3 is a plane view showing spaces between the articles.

FIGS. 4 to 6 show principal parts in an embodiment of the present invention, where FIG. 4 is a partial front view, FIG. 5 is a sectional view taken along the line V — V of FIG. 4, and FIG. 6 is a view showing situation where a pusher finger was forced to move upwards slidingly.

Figure 1:
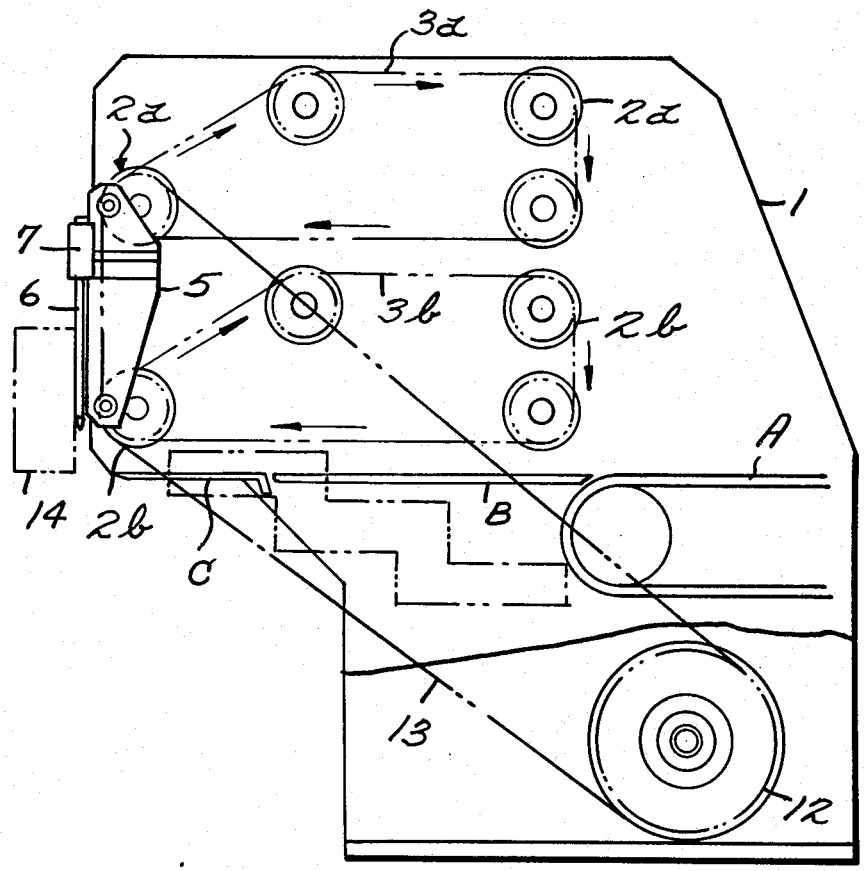
FIGS. 1 to 3 are schematic illustrations of a conventional article conveyance apparatus, where
Figure 2:
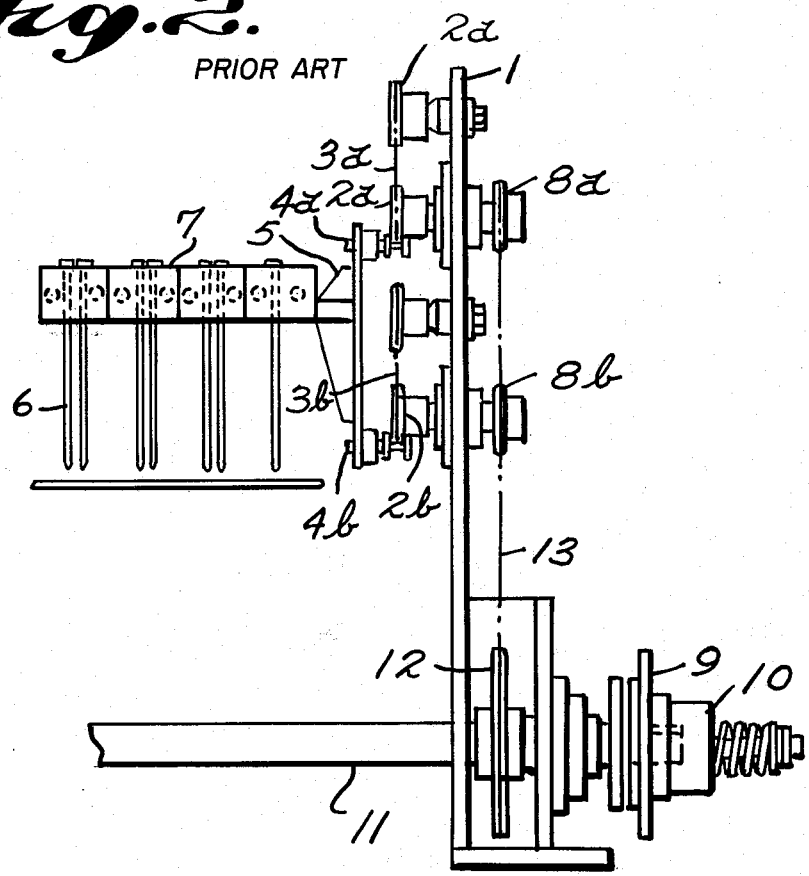
Figure 3:
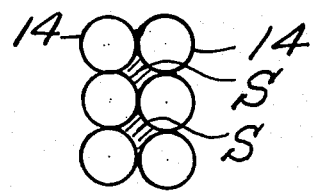

The embodiment of the present invention shown herein is completely identical with the conventional device shown in FIGS. 1 and 2 in the construction, action and relative arrangement of the component members, except that the construction and action of the pusher fingers, means for detecting erroneous behaviors of such fingers, and finger support are different from those in said conventional device and that no safety clutch 10 is provided between the sprocket 9 and driving shaft 11. Therefore, the identical members or parts are excluded from the drawings.

In FIGS. 4 to 6, reference numeral 15 indicates pusher fingers each of which has at its top end a stopper 15a and is slightly larger in diameter at its upper portion than at its lower portion, and 16 shows a finger support which has formed therein a plurality of vertical holes 16a in each of which is axially and lightly slidably fitted the upper large-diameter portion of each said pusher finger 15 through sealing members such as for example O-rings 21a, 21b positioned on each finger vertically spaced apart with a suitable interval therebetween. Normally, each pusher finger 15 suspends down by its own weight, with its top end sustained through the stopper 15a by the upper end face of the finger support 16 as shown in FIGS. 4 and 5.

Numeral 18 indicates a pressurized fluid supply hole formed in the finger support 16 to extend longitudinally along substantially the full length of the support, hole 18 being connected as its one end 17 to a pressurized fluid source (not shown), with the other end of the hole being closed. The pressurized fluid supply hole 18 is communicated with vertical holes 16a through respective connecting holes 19 each of which is closed at its end with a blind plug 20. At a suitable location in pressurized fluid supply hole 18 is provided a means for detecting change of pressure in hole 18, such as for example a pressure switch (not shown), designed such that the operation of the driving source of the driving shaft move the finger support 16 will be stopped by the detection signal from the detecting means. That is, the detecting means stay inoperative when the pressure in the pressurized fluid supply hole 18 is equal to the pressure in the pressurized fluid supply source, but when the pressure in hole 18 drops to a level close to atmospheric pressure, the detecting means is operated to issue a detection signal to stop operation of the driving source.

In operation of the present invention having the above-described arrangement, when the finger support 16 and the respective pusher fingers 15 make downward movement (during this period, the pusher fingers 15 are in a normal downwardly suspended state, and the pressurized fluid supply pipe 18, connecting holes 19 and spaces between the vertical holes 16a and the outer peripheral faces of the pusher fingers 15 sealed by O-rings 21a, 21b are all filled with pressurized fluid, and the pressures in all of these parts are kept equal to the pressure in the pressurized fluid source), if the lower portions of these members are smoothly fitted into the spaces between the cylindrical articles delivered successively in several rows on a conveyor belt, there is no problem, but if any one or more of the pusher fingers 15 fail to properly fit into said space or spaces due to some cause or other and hit against a cylindrical article or articles, the particular pusher finger or fingers 15 are forced up by the reaction force as shown in FIG. 6. This also causes the O-ring 21b at the lower part of the particular pusher finger 15 to move upwards accordingly to communicate the connecting hole 19 with the atmosphere through the space 22 between pusher finger 15 and the associated vertical hole 16a, allowing the pressurized fluid in the hole 18 to release into the atmosphere through connecting hole 19 and space 22, whereby pressure in said hole 18 falls close to the atmospheric pressure. Such change of pressure is immediately detected by a pressure switch which issues a detection signal to stop operation of the driving source of the driving shaft, thereby stopping downward movement of the finger support 16. In this case, it is to be noted that each pusher finger 15 is arranged to be lightly movable slidingly upwards in the axial direction, so that even if the cylindrical articles transported are soft ones, there is no possibility that the pusher fingers 15 should cause a dent or other damage to the articles.

Having the above-described construction and action, the present invention provides the following prominent advantages in practical uses:

1. Even in case any one or more of the pusher fingers should fail to properly fit into the space between the adjoining articles, that is, even in the event of erroneous behavior of the fingers, they won't inflict any damage to the articles. Also, even when articles transported are the ones made of a soft material, there is no possibility that they be dented, cut or damaged by the pusher fingers.

2. There is no need of making any delicate and troublesome adjusting operations as required in the conventional devices using a safety clutch. Further, the mechanism of the present invention is simple in construction, operates surely with high reliability and is also low in cost.

It will be apparent that the present invention can be applied to the various interlocking means in conveyor systems of the type where the articles of not only cylindrical configuration but also various other shapes, which are delivered successively in several rows, are sorted into groups each of a predetermined number of articles by inserting the pusher fingers into the spaces between the incoming articles and are thereby further transported.

What is claimed is:

1. In an articles transporting apparatus having a finger support with a plurality of finger bores for each slidably receiving a finger, means for circulating said support along a predetermined route and a plurality of pusher fingers each slidably received in one of said finger bores and each having a large diameter portion at the top thereof having a diameter greater than that of said bore for holding the finger in place, each said finger engaging said articles whereby the articles delivered successively in several rows by a conveyor means are divided into groups each of a predetermined number of articles by said pusher fingers and further transported, the improvement wherein said finger support has formed therein substantially along its full length a pressurized fluid supply bore connected to a pressurized fluid source, further bores connecting said supply bore to said finger bores the portion of each finger remote from said large diameter portion forming a path to the atmosphere from said further bore when that portion is adjacent the further bore opening into the finger bore to produce a detection signal indicating improper engagement of an article and a portion between said remote portion and said large diameter portion blocking flow of said pressurized fluid when that portion is adjacent the further bore opening.

* * * * *